3,708,457
PIGMENTED POLYOLEFIN COMPOSITIONS CONTAINING PHTHALOCYANINE COMPOUNDS
Donald G. Needham, Ramona, and George R. Hill, Bartlesville, Okla., assignors to Phillips Petroleum Company
No Drawing. Filed Feb. 16, 1971, Ser. No. 115,894
Int. Cl. C08f 45/14, 45/62
U.S. Cl. 260—41 C
8 Claims

ABSTRACT OF THE DISCLOSURE

Resistance to deterioration on exposure to weather of pigmented polyolefin compositions is improved by the incorporation into such compositions of certain phthalocyanine compounds.

---

This invention relates to polyolefin compositions. More particularly, this invention relates to pigmented polyolefin compositions modified by the inclusion therein of certain phthalocyanine compounds.

The polyolefinic materials such as polyethylene and polypropylene find an increasing usage in outdoor applications such as advertising signs, stadium seating, and the like. To appeal to man's aesthetic nature, such materials are generally pigmented to provide a color scheme harmonious with the environment in which they are utilized. The colorants for plastics include all types of pigments and dyes, as well as all physical forms in which they are available, which possess required properties in plastics systems. While many acceptable pigmented polyolefin compositions are known, there is a continuing need for such compositions having improved weatherability at economically acceptable cost levels.

The present invention provides pigmented polyolefinic materials which have an improved resistance to deterioration from exposure to outdoor weathering conditions. Such compositions are provided by incorporating into the pigmented polyolefinic compositions prior to forming the polyolefinic composition into the desired formed articles such as by extrusion or compression molding certain hereinafter-described phthalocyanine compounds at a level sufficient to modify the properties of said compositions. In addition to improving outdoor weatherability of polyolefinic compositions, the inclusion of phthalocyanine compounds into polyolefinic compositions has been found to be effective in improving the resistance of such compositions to degradative deterioration due to oxygen and ultraviolet light.

The pigmented polyolefin compositions to which the invention applies are the normally solid polymers of aliphatic olefins having from 2 to 8 carbon atoms per molecule, such as polymers of ethylene, propylene, isobutylene, 1-butene, 2-butene, 1-pentene, 1-hexene and the like, and including copolymers thereof, having incorporated therein at least one inorganic pigment. Such polymers can be linear or branched and can have either an irregular or regular steric structure. Such polymers can be produced by any of the methods known in the art. A particularly suitable method for preparing olefin polymers and copolymers for use in the present invention is that described in Hogan et al., U.S. Pat. 2,825,721. Another suitable method for preparing such polymers is that utilizing organometal catalyst systems comprising a transition metal compound, e.g., a titanium halide, in combination with a reducing compound such as an aluminum alkyl.

In forming the pigmented polyolefinic compositions which are modified according to the practice of this invention, the olefin polymers and copolymers will have compounded therewith at least one inorganic pigment, such as titanium dioxide, iron oxide, ultramarine red, cobalt aluminate, ultramarine blue, ultramarine green, chromium oxide and the like, in amounts conventionally used in the art. The particular inorganic pigment which is incorporated into the polyolefinic composition is not a critical feature of the invention.

The phthalocyanine compounds which are suitable for use in the practice of the invention include any of the compounds containing a tetrabenzoporphyrazine nucleus (four benzopyrrole nuclei joined four N-atoms), either metal-free or containing a metal such as copper, nickel or iron. Particularly preferred are those phthalocyanine compounds having the formula:

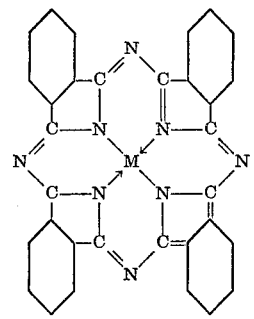

wherein M is a metal capable of forming a chelate structure. Such metals will include at least one member selected from the class consisting of copper, nickel, cobalt, chromium, iron, manganese and cadmium. Preferably, M is either copper or nickel. These materials re commercially available under the designation of phthalocyanine green and phthalocyanine blue. The phthalocyanine compounds can be incorporated in the polymeric compositions by any known manner such as by melt blending, dry blending or solution blending.

The phthalocyanine compounds employed in the practice of this invention can be used in widely varying amounts, such amounts being sufficient to be effective in obtaining improved results of this invention relative to the improvement in resistance to degradation from exposure to outdoor weathering. Generally, the phthalocyanine compound will be employed in amounts such that from about 0.01 to about 1.0, preferably from about 0.015 to about 0.4, weight percent, based on the total weight of the polyolefin material, is incorporated with the polymer. Mixtures of the various phthalocyanine additives can be used so long as the total concentration of all the phthalocyanine additives does not exceed the stated limits.

It is preferred that the amount of phthalocyanine additive which is incorporated into the inorganic pigmented polyolefin compositions be held below the tinctorial level to avoid interference with the inorganic pigmentation. In addition, indiscriminate use of the phthalocyanine additives, particularly in amounts above the tinctorial level, can result in warpage and crazing of shaped structures formed therefrom.

The phthalocyanine additives of the invention can be incorporated into the polymer in any conventional manner such as dry blending the powdered additives directly with polymer pellets or fluff by means of tumble mixers, Henschel blenders and the like. Solutions of slurries of the stabilizer of the additives can be sprayed onto or stirred with a granular polymer. Suitable solvents for this purpose include acetone, benzene, cyclohexane, methyl alcohol, and the like. In general, the solvent is evaporated out before the blend is extruded although, alternatively, the solvent-wetted polymer can be processed immediately by means of a devolatilizing extruder. The phthalocyanine additives can also be blended with the molten polymer by means of a Banbury mixer, Brabender mixer, roll mill, screw extruder and the like, if desired.

Additional conventional additives such as fillers, foaming agents, and the like, can also be used as desired. In general, conventional antioxidants and stabilizers to provide protection against thermal degradation are also used if desired. These additives include hindered phenols such as 2,2-di-tert-butyl-4-methylphenol, tetrakis[methylene-(3,5-di-tert-butyl-4-hydroxycinnamate)] methane and the like, diesters of 3,3′-thiodipropanoic acid such as dilauryl thiodipropionate, distearyl thiodipropionate and the like; phosphite esters such as tridecylphosphite, dioctyl phosphate, diphenyl phosphite, phenyldidecyl phosphite, and the like. In addition, inert carriers such as silica or diatomaceous earth can be employed as bulking agents and dispersing agents for the additives incorporated in the compositions of the invention.

The phthalocyanine-modified combinations of the present invention lend to polyolefinic compositions improved stability against deterioration due to outdoor weather exposure. Thus, polyolefins modified in accordance with the invention have an extended life expectancy and can be used more effectively in outdoor applications than presently known compositions. The polyolefin compositions prepared according to the invention can be cast, extruded, rolled or molded into a variety of useful shaped articles. The invention is further illustrated by the following example.

EXAMPLE

A poly(ethylene/hexene-1) copolymer having a melt index of 0.34 (ASTM D 1238–62T, Condition L) and a density of .95 g./cc. was used in four different runs. In each run, 0.5 weight percent, based upon the total weight of the polymeric material, of 2-hydroxy-4-n-octoxybenzophenone ultraviolet light stabilizer was incorporated into the polymer. In the four runs, varying amounts of inorganic pigment and phthalocyanine additive were incorporated.

The pigments and phthalocyanine additives, together with ultraviolet absorber, were added by mechanically blending with the polymer in a Banbury-type mixer operated at 190°–215° C. at a speed of about 200 r.p.m.

Each of the four poly(ethylene/hexene-1) portions containing inorganic pigment and phthalocyanine additive was tested to determine the resistance to outdoor exposure of the polymeric material. It will be noted that Run 1 contained incorporated therein 0.05 weight percent, based upon total weight of polymer, of antioxidant. The antioxidants were not compounded into Runs 2, 3 and 4 in order to accelerate testing for direct comparison purposes and to exclude a possible masking effect of the antioxidants. The weatherability, i.e., resistance to outdoor weathering of each of the poly(ethylene/hexene-1) portions was determined in accordance with the accelerated weathering testing procedure of ASTM E 42. In preparing the poly(ethylene/hexene-1) test samples, each of the blended samples was molded into a 50-mil sheet at 217° C. The sheet for each sample was then cut into standard tensile bars and the bars were placed in a standard weatherometer instrument. The results of the weatherability tests were reported in Table I.

TABLE I

| Run No. | 1 | 2 | 3 | 4 |
|---|---|---|---|---|
| Inorganic pigment: Ultramarine blue | 1.1 | 1.1 | 1.5 | 1.5 |
| Weatherability stabilizer: Phthalocyanine green | 0.3 | 0.3 | 0.3 | 0 |
| Ultraviolet light stabilizer: 2-hydroxy-4-n-octoxybenzophenone | 0.5 | 0.5 | 0.5 | 0.5 |
| Antioxidant: | | | | |
| 2,6-di-tert-butyl-4-methylphenol | 0.2 | 0 | 0 | 0 |
| Dilauryl thiodipropionate | 0.3 | 0 | 0 | 0 |
| Base resin: Poly(ethylene/hexene-1) copolymer | 100 | 100 | 100 | 100 |
| Tensile strength, p.s.i.: | | | | |
| Hours exposed: | | | | |
| 0 | 4,065 | 3,550 | 3,550 | 3,550 |
| 1,000 | 4,205 | | | |
| 2,000 | 4,250 | 4,150 | 2,050 | 1,300 |
| 3,000 | 4,200 | | | |
| 4,000 | 4,225 | 2,050 | 1,150 | <1,000 |
| Percent elongation: | | | | |
| Hours exposed: | | | | |
| 0 | 33 | 48 | 37 | 43 |
| 1,000 | 29 | | | |
| 2,000 | 16 | 9 | 4 | 3 |
| 3,000 | 10 | | | |
| 4,000 | 10 | 5 | 2 | 0 |

All amounts are parts by weight, unless otherwise noted.

From the above data it can be seen that the incorporation of a phthalocyanine additive into an inorganic pigment-pigmented polyolefin composition substantially improves the weatherability of such pigmented polyolefin compositions as indicated by the substantially higher tensile strengths and percent elongation of Runs 2 and 3 in comparison to the unmodified composition of Run 4.

Reasonable variations and modifications are possible within the scope of this disclosure without departing from the spirit and scope thereof.

We claim:

1. A composition of matter resistant to the deteriorative effect of exposure to weather consisting essentially of a polymer or copolymer of an olefin having from 2 to 8 carbon atoms; ultramarine blue pigment; and from about 0.01 to about 1.0 part by weight per 100 parts by weight of olefin polymer or copolymer of at least one phthalocyanine compound.

2. A composition of matter according to claim 1 wherein said phthalocyanine compound is present in an amount of .015 to .4 part by weight per 100 parts by weight of olefin polymer or copolymer.

3. A composition of matter resistant to the deteriorative effect of exposure to weather consisting essentially of polypropylene, ultramarine blue pigment, and from about 0.01 to about 1.0 part by weight per 100 parts by weight of polypropylene of phthalocyanine green.

4. In a method for improving the resistance to the deteriorative effect of exposure to weather of a polyolefin selected from the group consisting of a polymer or copolymer of an olefin having from 2 to 8 carbon atoms and having incorporated therein ultramarine blue pigment; the improvement which comprises incorporating into the pigment-containing polyolefin from 0.01 to 1.0 part by weight of at least one phthalocyanine compound per 100 parts by weight of polyolefin.

5. A method according to claim 4 wherein said phthalocyanine compound is present in an amount of .015 to .4 part by weight per 100 parts by weight of polyolefin.

6. A method according to claim 4 wherein said polyolefin is polyethylene, and said phthalocyanine compound is phthalocyanine green.

7. A method according to claim 6 wherein the amount of phthalocyanine green is 0.03 part by weight per 100 parts by weight of polyethylene.

8. A composition of matter according to claim 1 wherein said polymer or copolymer of an olefin having from 2 to 8 carbon atoms is a copolymer of ethylene and hexene-1 and said phthalocyanine compound is phthalocyanine green.

References Cited

UNITED STATES PATENTS 3,558,551   1/1971   Gilbert et al. _____ 260—41

OTHER REFERENCES

Modern Plastics Encyclopedia, 1965, vol. 44, No. 1A, September 1964, pp. 420–421.

MORRIS LIEBMAN, Primary Examiner

J. H. DERRINGTON, Assistant Examiner

U.S. Cl. X.R.

260—41 B, 45.75 R, 45.75 C, 45.75 N, 45.8 N